US005367348A

United States Patent [19]

Nachmanson et al.

[11] Patent Number: 5,367,348

[45] Date of Patent: Nov. 22, 1994

[54] METHOD OF SUBTITLING MOTION PICTURE FILMS

[75] Inventors: Savely Nachmanson, Poverstraat,

[73] Assignees: Titra Film, Joinville Le Pont, France; Titra Europe Holding BV, Amsterdam, Netherlands

[21] Appl. No.: 958,786

[22] Filed: Oct. 9, 1992

[30] Foreign Application Priority Data

Oct. 11, 1991 [FR] France ............................... 91 12580

[51] Int. Cl.[5] ............................................ G03B 21/32

[52] U.S. Cl. ................................................... 352/90

[58] Field of Search .................. 352/90; 430/199, 200, 430/201

[56] References Cited

U.S. PATENT DOCUMENTS

| | | | |
|---|---|---|---|
| 4,503,135 | 3/1985 | Drexler | 430/12 |
| 4,766,009 | 8/1988 | Imura et al. | 427/53.1 |
| 4,854,696 | 8/1989 | Guez | 352/90 |

FOREIGN PATENT DOCUMENTS

| | | |
|---|---|---|
| 0201391 | 11/1986 | European Pat. Off. . |
| 0464270A1 | 1/1992 | European Pat. Off. . |
| 1205830 | 11/1965 | Germany . |
| 1915273 | 10/1969 | Germany . |
| 1122463 | 5/1989 | Japan . |
| 8900017 | 8/1990 | Netherlands . |

*Primary Examiner*—Michael L. Gellner
*Assistant Examiner*—Eddie C. Lee
*Attorney, Agent, or Firm*—Bacon & Thomas

[57] ABSTRACT

A method of subtitling motion picture films in which graphics elements, characters, or texts are added to a motion picture film by means of a laser beam travelling over the zone to be marked of the film, comprises the following two steps: a first step, in which a laser etching operation is performed by applying a laser beam whose speed of displacement over the film lies in the range about 1 cm/s to about 200 cm/s, with its power on the film lying in the range about 100 milliwatts to about 20 watts, and with the ratio V/P of the displacement speed expressed in cm/s divided by the power on the film expressed in watts lying in the range 10 to 30 so as to be high enough for the laser beam to achieve complete transformation of the emulsion in the etched zones by causing the emulsion to be heated, softened, and dislocated, but without totally eliminating the transformed emulsion; and a second step, in which the etched film is subjected to cleaning treatment for cleaning the etched zones so that the particles of emulsion that have been heated and dislocated by the laser beam are eliminated from those zones of the film that have previously been marked by the low power laser beam, thereby causing transparent subtitles to appear.

13 Claims, 2 Drawing Sheets

METHOD OF SUBTITLING MOTION PICTURE FILMS

The present invention relates to a method of subtitling motion picture films in which graphic elements, characters, or text is added to a motion picture film by means of a laser beam travelling over the zone of the film that is to be marked.

BACKGROUND OF THE INVENTION

It is common practice to subtitle motion picture films by etching the emulsion of the developed film by a chemical method. In that case, the film emulsion is etched chemically in zones where symbols, descriptions, or text are to be added leaving the backing medium intact. Various types of chemical method are in existence, however all of them require a large number of manipulations, thereby impeding automation and preventing the total time taken to implement the method from being reduced.

More particularly, in a conventional chemical subtitling method, the surface of the emulsion of a film duplicate is initially coated with a protective layer, then the subtitled text is marked by means of plates in relief. The duplicates of the films are then passed through an appropriate reagent bath which destroys the emulsion at the locations marked by the plates. The protective layer is then removed from the duplicates either by being dissolved or by washing. Various types of washing arrangements are known in the art as represented, for example, by the washing arrangements depicted in FIGS. 1 and 2 herein. As shown in FIG. 1, a film 5 flows from a reel 8 through a washing unit 10 defined by a container 11 and then is wound upon another reel 12. Washing unit 10 can include heating units 15 and/or an ultrasound generating unit 18 in a manner known in the art. In the conventional washing arrangement shown in FIG. 2, a film 25 extends between an unwinding reel 28 and a winding reel 32. Between reels 28 and 32 is positioned a tank 31. Above tank 31 is positioned a spraying unit 35 including a plurality of nozzles 37 for applying jets of washing liquid upon film 25.

After rinsing and drying, the subtitles appear completely transparent and can easily be read when the films are projected.

In spite of the quality of the results obtained, chemical type subtitling methods are penalized by the slowness of the treatment, the need to establish artwork and plates of very high quality, its sensitivity to the accuracy with which various parameters are adjusted such as the relief and the pressure of the plates, the problem of choosing reagents and of irregularities in adhesion and in consistency of the protective layer, the need to take account of the sensitivity and the defects of the emulsions of the prints to be subtitled, and the slowness and the instability of the mechanical engagement between the plate and the film.

The various factors mentioned above thus make implementing a chemical type subtitling method relatively expensive and difficult to automate.

Proposals have also been made to mark motion picture films by means of a high energy laser beam which causes the film emulsion to be ablated locally. The laser beam can be applied through a mask or it may be deflected so as to travel along a determined path corresponding to the inscriptions to be formed on the film. For example, one known motion picture film marking arrangement is shown in FIG. 3 wherein a film 45 is caused to move in the direction of arrow F under a laser beam 48. As is known in the art, laser beam 48 creates subtitles or other markings on film 45 as film 45 passes thereunder. Laser beam 48 is created by a laser unit 50. The output from laser unit 50 is directed to an optical focusing and deflection system 55 which properly positions laser beam 48 in two dimensions, i.e., in both X and Y coordinate planes. Laser unit 50 and optical focusing and deflection system 55 are controlled by means of a control unit 60. More specifically, the output power of laser unit 50 is controlled by control unit 60 by signals outputted through control line 62. In a similar manner, optical focusing and deflection system 55 receives control signals from control unit 60 through control lines 64 and 65 in order to properly position laser beam 48.

In laser subtitling methods, the quality of the result depends on the nature of the emulsion and on the background density of the images on which the subtitles are to be etched. In practice, it has been observed that it is impossible to maintain inscriptions having strokes of constant width under normal working conditions, i.e. with long films having images of varying color and contrast and having emulsions of various characteristics. The working parameters, and in particular the power of the laser beam radiation applied to the film and the displacement speed of the laser beam can be adjusted over ranges of values that are quite large but that depend strongly on the emulsion, thereby making it difficult to obtain subtitles that are sharp and pleasant in appearance using only one pass of the laser beam on the film.

In known laser subtitling methods, the power, the exposure time, and the wavelength are selected so as to destroy the emulsion completely at points where the laser beam strikes the film. The laser etching performed using such a method is nevertheless of non-uniform quality. Thus, there often remain dark zones and spots that are colored to a greater or lesser extent due to gelatinous residues or to damage to the surface of the backing medium which is difficult to control with certain types of media, in particular those made of polyester.

Implementing laser beams of non-negligible power suitable for enabling the emulsion to be etched sufficiently at a working speed that is not too slow gives rise to equipment that is expensive, that consumes a large quantity of electricity and of cooling water, and that requires laser sources to he used that are relatively fragile.

The present invention seeks specifically to remedy the above-mentioned drawbacks and to enable subtitling operations to be performed on motion picture films quickly, cheaply, and automatically while nevertheless obtaining results of good quality with subtitles that are sharp and free from projections, spots, or grayish zones.

SUMMARY OF THE INVENTION

These objects are achieved by a method of subtitling motion picture films in which graphics elements, characters, or texts are added to a motion picture film by means of a laser beam travelling over the zone to be marked of the film, the method comprising two steps, namely:

a first step, in which a laser etching operation is performed by applying a laser beam whose speed of displacement over the film lies in the range about 1 cm/s to about 200 cm/s, with its power on the film lying in the range about 100 milliwatts to about 20 watts, and with the ratio V/P of the displacement speed V expressed in cm/s divided by the power on the film P expressed in watts lying in the range 10 to 30 so as to he high enough for the laser beam to achieve complete transformation of the emulsion in the etched zones by causing the emulsion to be heated, softened, and dislocated, but without totally eliminating the transformed emulsion; and a second step, in which the etched film is subjected to cleaning treatment for cleaning the etched zones that the particles of emulsion that have been heated and dislocated by the laser beam are eliminated from those zones of the film that have previously been marked by the low power laser beam, thereby causing transparent subtitles to appear.

The cleaning treatment applied to the etched zones advantageously consists in putting the etched film into contact with a washing bath.

The method of the invention is well adapted to subtitling motion picture films on a backing medium constituted by a cellulose derivative such as cellulose triacetate, however it is equally applicable to films on a medium made of plastic, such as polyester.

Compared with subtitling methods that use laser radiation in a single pass exclusively, in which the photographic emulsion is entirely destroyed and removed in a single step by the sole action of the laser beam, the method of the invention has the advantage of requiring equipment that is cheaper, that consumes less energy, and that achieves results of high photographic quality without spots, or colored or grayish zones, or stroke irregularities while nevertheless scanning the laser beam at a relatively high speed, such that the overall time taken by the subtitling method can be greatly reduced.

DETAILED DESCRIPTION

According to the invention, the subtitling of motion picture films comprises an etching first step in which a laser source is used and a second step which consists in applying a cleaning treatment to the zones etched by means of the laser beam during the first step.

In a preferred implementation, the second step consists in passing the film through a bath having the purpose of finishing off the laser subtitling action so as to make the subtitles completely transparent.

The laser source may be of relatively low power and it may be constituted, for example, by an ionized argon laser whose emitted power is about 10 or 20 watts, or else by a semiconductor laser whose emitted power is of the order of a few hundreds of milliwatts.

It is possible to use other types of laser source that make it possible to obtain laser beam Mission at a power lying in the range about one hundred milliwatts to a few tens of watts.

Figure 3:
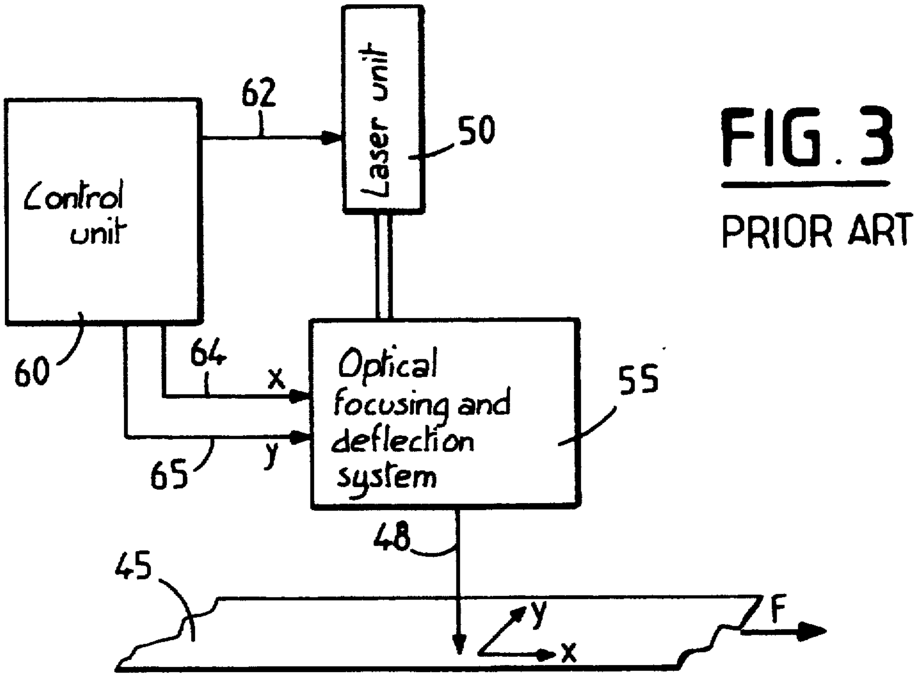
FIG. 3 PRIOR ART
FIG. 3 symbolically depicts a system known in the art for marking films with a laser beam.

The laser beam is applied to a conventional device as represented, for example, by the laser beam etching system depicted in FIG. 3 and discussed above, for performing optical focusing and deflection in two rectilinear X and Y directions parallel to the plane of the film.

The deflection device is controlled by a computer enabling the laser beam to travel over the film to be subtitled along a path that corresponds to the inscriptions that constitute the subtitles.

The laser beam may be focused in such a manner that the diameter of its point of impact on the film (which has a bearing on the width with which character strokes are written) lies between about 30 micrometers and about 300 micrometers.

According to the invention and given losses in the focusing and deflection device, the power P1 of the laser beam as applied to the film may correspond, for example, to about half the power P0 emitted by the laser source, and it may be maintained at a relatively low value, e.g. lying between about 500 milliwatts and a few watts, while the speed V with which the laser beam is moved over the film and which corresponds to a writing speed is itself preferably between about 10 cm per second and about 100 cm per second.

The power P1 of the laser beam and its writing speed V are determined in such a manner that during the step where the film is being etched in a single pass of the laser beam, the photographic emulsion is not completely removed even though it is burnt and partially vaporized, i.e. in such a manner that the laser beam cannot damage the transparent backing medium of the film, which medium may itself be constituted equally well by a cellulose triacetate or by a polyester.

The first step of the method in which a laser beam is put into contact with the film thus consists essentially in producing localized transformations of the emulsion in those zones that are to constitute the subtitles, by heating, softening, and dislocating the emulsion, but without completely vaporizing and eliminating the emulsion.

Such treatment differs substantially from conventional methods of directly etching films with a laser in which the medium is laid bare where the laser beam has passed in order to form transparent zones.

Conventional methods of etching films by laser cannot be used with films where the medium is made of polyester and in general lead either to grayish zones or spots being formed, or to stroke irregularities due to variations in the background coloring of the image, or else to the medium being deformed because the power of the beam on the film and the impact time of the laser beam were too long, given the need to eliminate the emulsion completely.

By way of example, subtitles having stroke widths of 80 micrometers have been made on films constituted by common color positive films sold under the trademarks Eastmancolor, Fujicolor, and Agfa-Gervaert, by applying powers P1 of 2 or 3 watts to the film during the laser beam writing step while using laser beam displacement speeds V of 40 cm/second, such that the ratio V/P1 lies in the range about 12 to 20.

Figure 4:
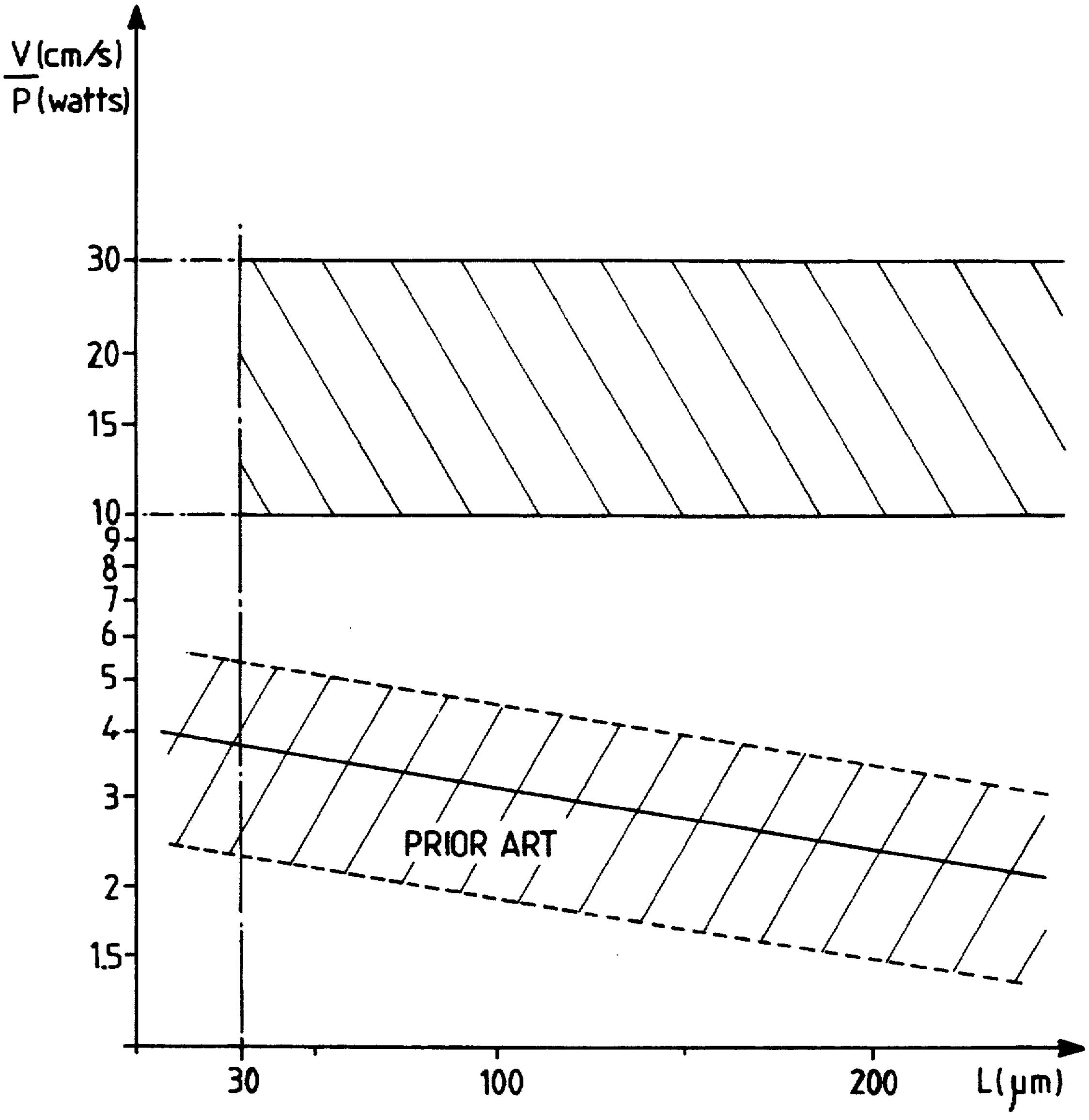
FIG. 4 is a graph illustrating the operating range of a laser beam type motion picture subtitling system operated in accordance with the method of the present invention as compared to the prior art.

In general, according to the invention, it is possible to select a laser beam displacement speed on the film lying in the range about 1 cm/s to about 200 cm/s, and the power P1 of the laser beam on the film may itself lie in the range about 100 milliwatts to about 20 watts. The ratio V/P1 of the displacement speed V expressed in cm/s divided by the power on the film P1 expressed in watts, although capable of being selected within fairly wide tolerances, must nevertheless lie between about 10 and about 30, as represented in FIG. 4 i.e. it must be high enough to ensure that the laser beam achieves complete transformation in the etched zones by causing the emulsion to be heated, softened, and dislocated, while nevertheless not totally eliminating the transformed emulsion.

When treated by the invention, the backing medium, be it made of cellulose triacetate or of polyester, always remains completely unaffected at the end of the first step of laser etching, given the small energy levels applied to the film. The subtitles which are then constituted by portions of emulsion that have been transformed but that have not been completely eliminated are not yet genuinely readable with all the desirable clearness.

Figure 1:
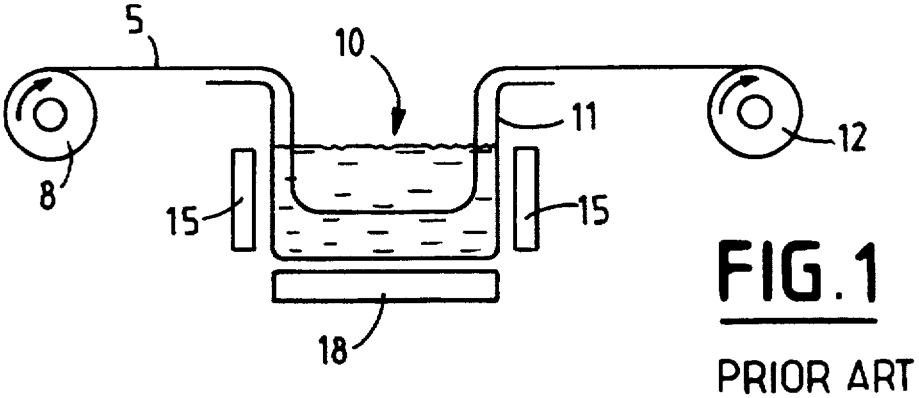
FIG. 1 PRIOR ART
FIG. 1 schematically represents a film washing arrangement according to the prior art.
Figure 2:
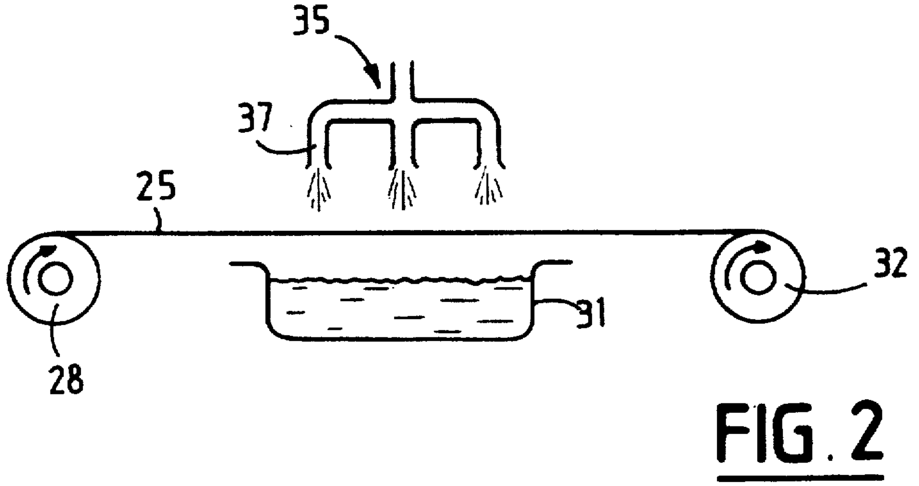
FIG. 2 PRIOR ART
FIG. 2 represents another conventionally known film washing arrangement.

In a preferred implementation, the second step of the method of the invention consists in putting the film in contact with a washing bath which serves to eliminate the particles of emulsion that have been heated and dislocated by the laser beam from those zones of the film that have been marked by the low power laser beam. For this purpose, any conventional washing arrangement for films can be utilized, such as those described above with reference to FIGS. 1 and 2.

After this operation of removing the transformed particles of emulsion, the subtitles appear in the form of uncovered zones of transparent backing medium. The film is then subjected to a drying operation.

During the step of removing the particles of emulsion, the film comes into contact with the bath for a time that cannot exceed a few seconds.

Various implementations are possible for bringing the film into contact with the washing bath.

The chemical composition of the washing bath reagent, the temperature of the bath, and the length of time the film is in contact with the bath can all be adapted to the particular characteristics of the photographic emulsion.

Good results can be obtained by causing the film to pass for a few seconds through a washing bath formed by an aqueous solution including a wetting agent or a detergent.

The washing bath is advantageously heated to a temperature lying in the range about 30° C. to about 80° C., and preferably lying in the range about 50° C. to about 60° C.

The washing bath may be subjected to the action of ultrasound in order to activate the effect of the bath.

On leaving the washing bath, the film may be rinsed by means of jets on both faces, and it may then be subjected to drying (spin drying and evaporation).

In another implementation, the washing bath is sprayed onto the film in the form of jets directed essentially against its face that is covered in emulsion, after which the film is subjected to the same rinsing and drying operations.

The washing bath may have a wide variety of compositions. The washing bath may be based on alcohol which facilitates drying operations.

Good results have been obtained with baths made up of the traditional wetting agent solutions as used in the treatment of photographic or motion picture films.

The results are equally good regardless of whether the films have a backing medium made of cellulose triacetate or made of polyester.

It may be observed that an essential aspect of the invention lies in implementing a first step in which the energy applied to the film during the etching operation is voluntarily limited, with the etching action being finished off by a cleaning operation performed during a second step.

This method of proceeding makes it possible to obtain good results that are better than those that can be obtained during an etching operation using a laser beam in a single pass only, while nevertheless providing greater flexibility in selecting operating parameters, in particular selecting the power of the laser beam and its travel speed, since they are less dependent on the degree to which the beam is focused or the nature of the emulsion or of the backing medium, for example.

It may be observed, that with certain types of medium, e.g. cellulose triacetate, a variant of the second step in which the etched zones are cleaned to make them clear and transparent need not be performed by passing the film through a bath, but may be performed by using a second pass of the laser beam over the same zones to be etched of the film, the second pass likewise being performed under conditions where relatively little energy is applied to the film, analogous to the conditions of the first step.

Traditional methods of subtitling motion picture films by means of a laser beam can thus be improved, with respect to the quality of the results, particularly the uniformity of stroke width, providing a first pass is performed in compliance with the first step defined in the present description. By performing etching twice over by causing the laser beam to pass over the film to be subtitled twice under the conditions of the present invention, it is possible to obtain excellent results, with great flexibility of implementation, in particular on media such as cellulose triacetate. This technique leads merely to a significant increase in the duration of the subtitling operations which may be a handicap, particularly when the subtitles include a great deal of writing, as applies in particular for duplicates of films that need to be given subtitles that take up several lines. That is why a method in which the second step is implemented by putting the film into contact with a washing bath instead of using a second laser etching operation can be considered as being simultaneously more universal and faster in operation.

We claim:

1. A method of subtitling motion picture films in which graphics elements, characters, or texts are added to a motion picture film by means of a laser beam travelling over the zone to be marked of the film, the method comprising two steps:

a first step, in which a laser etching operation is performed by applying a laser beam whose speed of displacement over the film lies in the range about 1 cm/s to about 200 cm/s, with its power on the fill lying in the range about 100 milliwatts to about 20 watts, and with the ratio V/P of the displacement speed V expressed in cm/s divided by the power on the film P expressed in watts lying in the range 10 to 30 so as to be high enough for the laser beam to achieve complete transformation of the emulsion in the etched zones by causing the emulsion to be heated, softened, and dislocated, but without totally eliminating the transformed emulsion; and a second step, in which the etched film is subjected to cleaning treatment for cleaning the etched zones so that the particles of emulsion that have been heated and dislocated by the laser beam are eliminated from those zones of the film that have previously been marked by the low power laser beam, thereby causing transparent subtitles to appear.

2. A method according to claim 1, wherein during the second step, while cleaning the etched zones, the etched film is put into contact with a washing bath.

3. A method according to claim 2, wherein the washing bath is constituted by a solution containing a wetting agent.

4. A method according to claim 2, wherein the washing bath is constituted by an aqueous solution containing a detergent.

5. A method according to claim 2, wherein the washing bath is constituted by an alkaline solution.

6. A method according to claim 2, wherein the washing bath is constituted by a bath of alcohol.

7. A method according to claim 2, wherein during the second step, the etched film is passed through the washing bath and the washing bath is subjected to the action of ultrasound.

8. A method according to claim 2, wherein the washing bath is put into contact with the etched film by means of jets of liquid sprayed onto at least that face of the film which is covered in the photographic emulsion.

9. A method according to claim 2, wherein the washing bath is heated to a temperature lying in the range about 30° C. to about 80° C.

10. A method according to claim 1, wherein during the second step, in order to clean the etched zones enabling them to become clear and transparent, a second pass of the laser beam is performed over the same zones to be etched of the film, the second pass likewise being performed under conditions of relatively low energy application analogous to those of the first step, but giving rise to total elimination of the emulsion that has already been transformed in the first step of etching.

11. A method according to claim 1, and applied to motion picture films having a backing medium made of cellulose triacetate.

12. A method according to claim 1, and applied to motion picture films having a backing medium made of a plastic such as polyester.

13. A method according to claim 1, wherein the laser beam is produced from a semiconductor laser source.

* * * * *

UNITED STATES PATENT AND TRADEMARK OFFICE

CERTIFICATE OF CORRECTION

PATENT NO. : 5,367,348
DATED : November 22, 1994
INVENTOR(S) : Nachmanson et al.

It is certified that error appears in the above-indentified patent and that said Letters Patent is hereby corrected as shown below:

Claim 1, column 6, line 56 change "fill" to --film--.

Signed and Sealed this

Twelfth Day of March, 1996

*Attest:*

Bruce Lehman

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,367,348

DATED : November 22, 1994

INVENTOR(S) : Nachmanson et al.

It is certified that error appears in the above-indentified patent and that said Letters Patent is hereby corrected as shown below:

On the title page

Please change Item [73] to read as follows:

[73] Assignees: TITRA FILM, Joinville Le Pont, France; LABORATOIRES TITRA, Bruxelles, Belgium; TITRA EUROPE HOLDING BV, Amsterdam, Netherlands Signed and Sealed this Seventh Day of May, 199[illegible]

Attest:

BRUCE LEHMAN

*Attesting Officer*

*Commissioner of Patents and Trademarks*